United States Patent
Irwin et al.

(10) Patent No.: US 6,393,795 B1
(45) Date of Patent: May 28, 2002

(54) ADHESIVE ANCHOR AND SYSTEM

(75) Inventors: James C. Irwin, Scarborough (CA); Mark S. Timmerman, Elgin, IL (US); Richard J. Ernst, San Diego, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/640,205

(22) Filed: Aug. 16, 2000

(51) Int. Cl.[7] ................................................. E04B 1/41
(52) U.S. Cl. .............................. 52/698; 52/699; 52/701; 52/708; 52/707; 52/105; 411/82.1
(58) Field of Search .......................... 52/698, 699, 701, 52/704, 703, 708, 707, 105; 411/14, 82, 82.1

(56) References Cited

U.S. PATENT DOCUMENTS

| | | | | |
|---|---|---|---|---|
| 1,108,859 A | * | 8/1914 | Bennett ........................ | 52/698 |
| 1,531,754 A | * | 3/1925 | Palmer ......................... | 52/698 |
| 1,965,639 A | * | 7/1934 | Glass ........................... | 52/698 |
| 3,512,328 A | * | 5/1970 | Eriksson ....................... | 52/698 |
| 4,129,007 A | * | 12/1978 | Rausch ........................ | 405/261 |
| 4,139,323 A | * | 2/1979 | Brandstetter ................. | 405/260 |
| 4,160,614 A | | 7/1979 | Koval | |
| 4,295,761 A | | 10/1981 | Hansen | |
| 4,477,209 A | | 10/1984 | Hipkins, Jr. et al. | |
| 4,516,883 A | | 5/1985 | Zeitler | |
| 4,642,964 A | * | 2/1987 | Kellison ....................... | 52/699 |
| 4,729,705 A | * | 3/1988 | Higgins ........................ | 411/82 |
| 4,865,489 A | | 9/1989 | Stankus et al. | |
| 5,073,064 A | | 12/1991 | Leonard et al. | |
| 5,263,804 A | * | 11/1993 | Ernst et al. ................... | 411/82 |
| 5,562,377 A | * | 10/1996 | Giannuzzi et al. ............ | 411/82 |
| 5,568,711 A | * | 10/1996 | Popp et al. ................... | 52/704 |
| 5,569,007 A | | 10/1996 | Abraham | |
| 5,628,161 A | * | 5/1997 | Giannuzzi et al. ............ | 52/698 |
| 5,671,576 A | * | 9/1997 | Kluser .......................... | 52/512 |
| 5,888,334 A | * | 3/1999 | Abraham ...................... | 156/293 |

\* cited by examiner

Primary Examiner—Carl D. Friedman
Assistant Examiner—Phi Dieu Tran A
(74) Attorney, Agent, or Firm—Schwartz & Weinrieb

(57) ABSTRACT

An adhesive anchor system having a ribbed anchor member with a threaded opening therein, a tube member having a first end portion connected to an end of the anchor member in alignment with the opening thereof, and a cap covering the opening at another opposite end of the anchor member. In some embodiments the tube member includes measurement indicia thereon for accurate depth placement, and may include a severable portion protruding beyond the work surface and/or a removable tube cover to prevent contamination of the threaded opening of the anchor member.

38 Claims, 3 Drawing Sheets

ADHESIVE ANCHOR AND SYSTEM

BACKGROUND OF THE INVENTION

The invention relates generally to construction anchors, and more particularly to adhesive anchors and systems.

It is known generally to bond an internally threaded anchor in a hole formed in concrete, masonry or some other work material for fastening a threaded shaft member thereto.

U.S. Pat. No. Re. 35,659 entitled "Adhesive Anchor", assigned commonly with the present application, for example, discloses a cylindrical anchor having a cap with a frangible portion snap-fit over a threaded bore disposed partially in the anchor. A flange on the cap mounts on a work material surface to limit insertion of the anchor into a hole in the work material. The cap prevents adhesive contamination oft he threaded bore during bonding. Thereafter, a threaded shaft is disposed through the frangible portion of the cap and is engaged with the threaded bore of the anchor.

An object of the present invention is to provide novel adhesive anchors and systems that overcome problems in and improve upon the prior art.

Another object of the invention is to provide in some embodiments thereof novel adhesive anchors and systems that are economical and reliable.

Another object of the invention is to provide in some embodiments thereof novel adhesive anchors and systems having improved retention performance.

A further object of the invention is to provide in some embodiments thereof novel adhesive anchors and systems that comply with industry cracked-concrete standards.

Another object of the invention is to provide in some embodiments thereof novel adhesive anchors and systems accurately disposable depthwise into a work material bore.

Yet another object of the invention is to provide in some embodiments thereof novel adhesive anchors and systems less susceptible to contamination by adhesive and debris.

Still another object of the invention is to provide in some embodiments thereof novel adhesive anchors and systems that are readily visible after bonding in a work material bore, prior to installation of a threaded shaft therein.

A more particular object of the invention is to provide in some embodiments thereof novel adhesive anchor systems comprising a ribbed anchor member having a threaded opening therein, a tube member having a first end portion connected to an end of the anchor member in alignment with the threaded opening thereof, and a cap covering the threaded opening at an opposite end of the anchor member.

Another more particular object of the invention is to provide in some embodiments thereof novel adhesive anchor systems comprising an anchor member adhered in a bore of a work material spaced apart from a surface thereof, a tube member having a first end portion coupled to the anchor member in alignment with a threaded opening thereof, the tube member extending between the anchor member and the work material surface, with an axial portion of the tube member protruding beyond the work material surface.

Another more particular object of the invention is to provide in some embodiments thereof novel improvements in adhesive anchoring applications including an anchor member bonded in a bore of a work material, the improvement comprising a tube member bonded in the bore and having a first end portion coupled to the anchor member in alignment with a threaded opening thereof, the anchor member spaced apart from a surface of the work material by the tube member, a second end portion of the tube member not extending beyond the work material surface, and a shaft disposed through the tube member and a threaded portion thereof engaged with the threaded opening of the anchor member.

Yet another more particular object of the invention is to provide in some embodiments thereof novel adhesive anchor systems comprising a ribbed anchor member disposed in a bore of a work material and spaced apart from a surface thereof, a shaft disposed in the bore and a threaded portion thereof engaged with a threaded opening of the anchor member, an adhesive disposed in the bore in adhering contact therewith and in adhering contact with the anchor member and at least a portion of the shaft.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
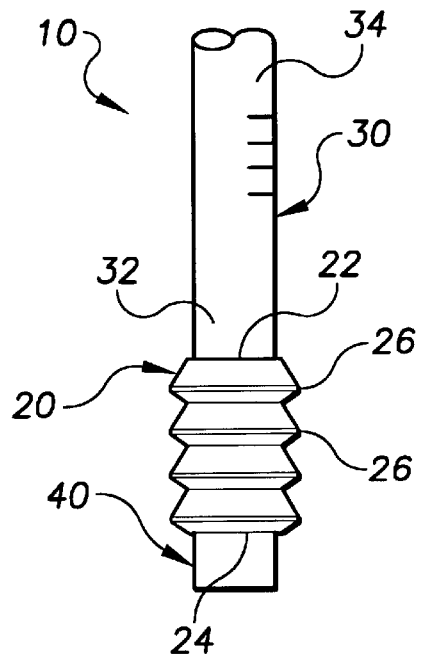
FIG. 1 exemplary adhesive anchor system prior to installation.

FIG. 1 illustrates a first exemplary adhesive anchor system 10 comprising an anchor member 20 having first and second opposite ends 22 and 24, and one or more generally annular rib members 26 disposed about an outer side portion thereof. Other rib configurations may be used alternatively. The anchor member is preferably formed of a metal material, but it could be some other material, for example, in light duty applications, plastic.

Figure 2:
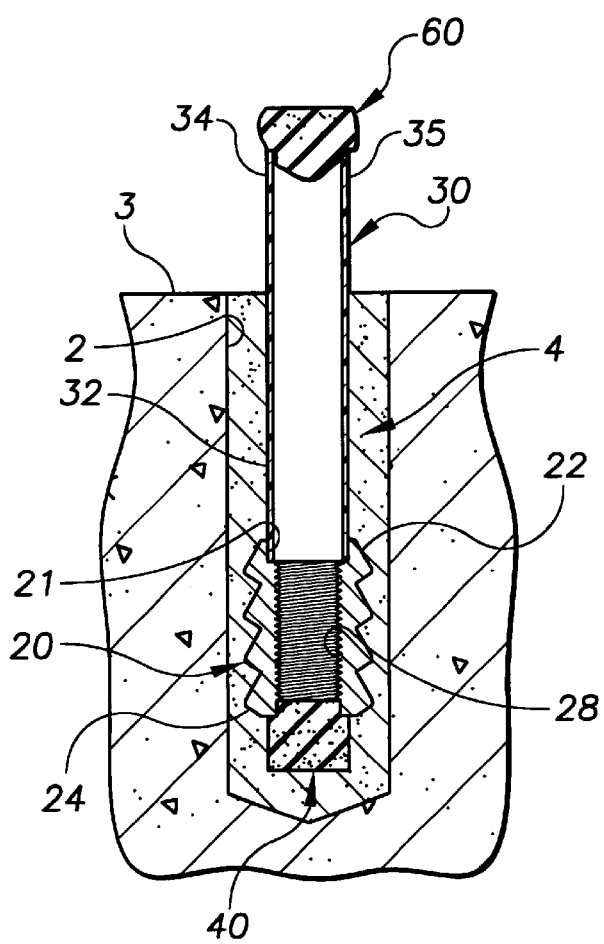
FIG. 2 is an exemplary adhesive anchor system adhered in a work material bore prior to installation of a threaded shaft therein.

In FIG. 2, the anchor member 20 preferably has an at least partially threaded opening 28 extending fully therethrough, between the first and second opposite ends thereof. In alternative embodiments however the threaded opening 28 extends only partially into the anchor member, as illustrated in the exemplary embodiment of FIG. 4.

In FIGS. 1 and 2, the anchor system also comprises a tube member 30 having first and second opposite end portions 32 and 34. The first end portion 32 of the tube member is connected or coupled to the first end 22 of the anchor member in alignment with the threaded opening thereof. The tube member 30 is preferably a plastic material, but in alternative embodiments it could be a paper product or cardboard material or metal.

In FIG. 2, the anchor member 20 has a counterbore 21 disposed in or about the threaded opening 28 on the first end thereof. The first end portion 32 of the tube member 30 is disposed and retained in the counterbore 21 of the anchor member, for example by an adhesive or by frictional engagement therewith or by some other connection means.

The anchoring system also preferably comprises a cap member covering the threaded opening at the second end 24 of the anchor member 20, opposite the tube member, to prevent adhesive and debris from contaminating the threaded opening during installation of the anchor system 10. In some embodiments, the threaded opening 28 extends only partially into the anchor member 20 and thus the cap member is not required on the second end thereof.

Figure 3:
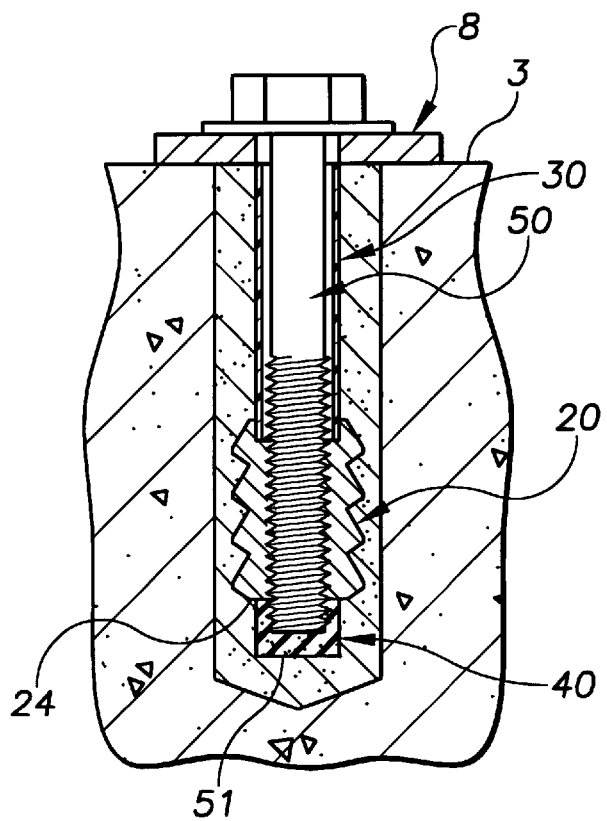
FIG. 3 is an exemplary adhesive anchor system having a threaded shaft installed therein.

In the exemplary embodiment of FIGS. 2 and 3, the cap member is a compressible or collapsible member 40, for example a polystyrene foam material, that may be readily inserted into the threaded opening 28 without modification to the anchor member. In FIG. 3, the exemplary foam cap member 40 is collapsible by an end portion 51 of a threaded shaft 50 disposed through the anchor member 20, as illustrated and discussed further below.

Figure 5:
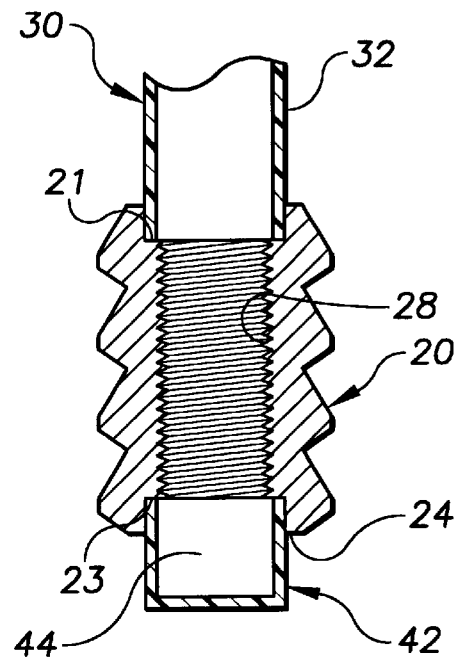
FIG. 5 is an alternative cover member.

In the exemplary alternative embodiment of FIG. 5, the cap member is in the form of a plastic cap plug 42 disposed and retained in a counterbore 23 in or about the threaded opening on the second end 24 of the anchor member 20, for example by an adhesive or by frictional engagement therewith. The cap plug 42 preferably includes an axial cavity 44 aligned with the threaded opening 28 and extending therefrom to accommodate any portion of the threaded shaft that extends through and beyond the second end of the anchor member.

Figure 6:
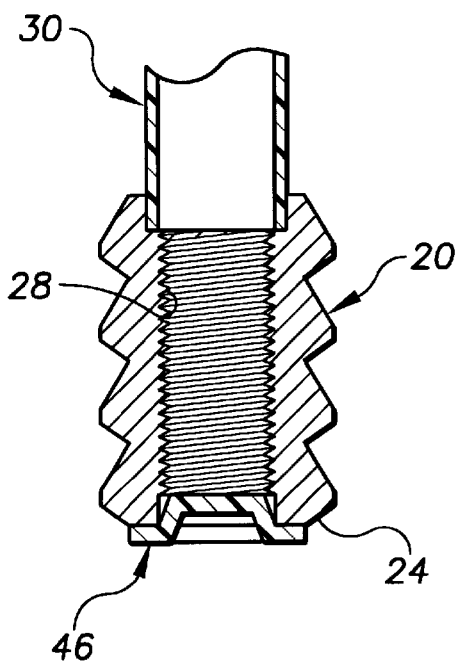
FIG. 6 is another alternative cover member.

In the exemplary alternative embodiment of FIG. 6, the cap member is in the form of a plastic cap plug 46 disposed and retained in the threaded opening 28 on the second end 24 of the anchor member 20, without a counterbore. In other embodiments, the threaded bore on the second end of the anchor member is covered with other means, for example tape.

The exemplary adhesive anchor system of FIG. 2 also comprises a removable tube cap 60 covering an opening of the tube member 30 at the second end portion 34 thereof. The tube cap 60 prevents adhesive and debris from entering the threaded opening 28 of the anchor member 20 prior to installation of a threaded shaft therein.

The tube cap or cover is particularly desirable in applications where substantial time elapses between bonding the anchor system in a work material bore and installation of the threaded shaft therein. The exemplary tube cover 60 is a foam material removably disposed in the tube member 30, but in alternative embodiments it may comprise tape or a removable or frangible cap or any other removable cover member. Alternatively, the tube member may in some embodiments thereof, for example paperboard tubes, be pinched or folded closed at the top.

The anchor member 20, tube member 30, and the cap member 40, if any, as well as any tube cover are preferably pre-assembled as illustrated in FIG. 1 prior to installation thereof in a work material as discussed more fully below.

In FIG. 2, the preassembled anchor system, including the anchor member, at least a portion of the tube member 30 and any cap 40 is initially disposed in and bonded to a bore 2 formed in or through a work material surface 3 with an adhesive 4.

Adhesives suitable for use with the present invention include, among others, acrylics and epoxies, preferably one of the EPCON Adhesive Anchoring System products by ITW Red Head, Wood Dale, Ill.

FIG. 2 illustrates the anchor member 20 adhered in the bore 2 of the work material, spaced apart from the surface 3 thereof. The tube member 30 is also adhered to the bore 2 and extends between the anchor member 20 and the work material surface 3.

An axial portion 35 of the tube member 30 preferably protrudes above or beyond the work material surface 3 during the bonding operation, thereby preventing debris and adhesive from contaminating the threaded opening 28 of the anchor member 20. The tube cap or cover 60 may be used alternatively or in combination with the protruding portion 35 of the tube member for this purpose.

In FIG. 1, the tube member 30 and particularly the upper end portion 34 thereof preferably includes markings thereon, for example measurement indicia, for accurately gauging the depth the anchor member is disposed into the bore during the bonding operation.

The tube member portion 35 protruding beyond the work surface 3 after the bonding operation functions as a visual indicator for ready location of the anchor member by installation crews returning to the work site after the adhesive has cured.

After bonding is complete, any portion of the tube member protruding beyond the surface 3 of the work material is removed, for example by severing, so that the remaining portion of the tube member does not extend beyond the work surface 3, as illustrated in FIG. 3. In some applications, the tube member is coated with a release agent prior to bonding in the bore and is removed therefrom after the adhesive has cured.

The threaded shaft 50 is subsequently disposed through the tube member 30, or through an opening through the cured adhesive in applications where the tube member is withdrawn from the bore, and a threaded portion of the shaft 50 is engaged with the threaded opening 28 of the anchor member 20 bonded in the work material bore.

The threaded shaft 50 may be part of a headed stud, for example a bolt, or it may be a threaded shaft with a nut or some other threaded member disposed thereabout.

In FIG. 3, the cap member 40 is compressible or collapsible to accommodate the end portion 51 of the threaded shaft 50 that extends beyond the second end 24 of the anchor member 20. Cap members that accommodate the shaft end portion compensate for shallow placement of the anchor member in the bore and final system adjustment.

The use of measurement indicia on the upper portion 34 oft he tube member for gauging the proper depth of the anchor system for a given threaded shaft will eliminate or at least reduce the extent to which the threaded shaft extends beyond the end of the anchor.

Figure 4:
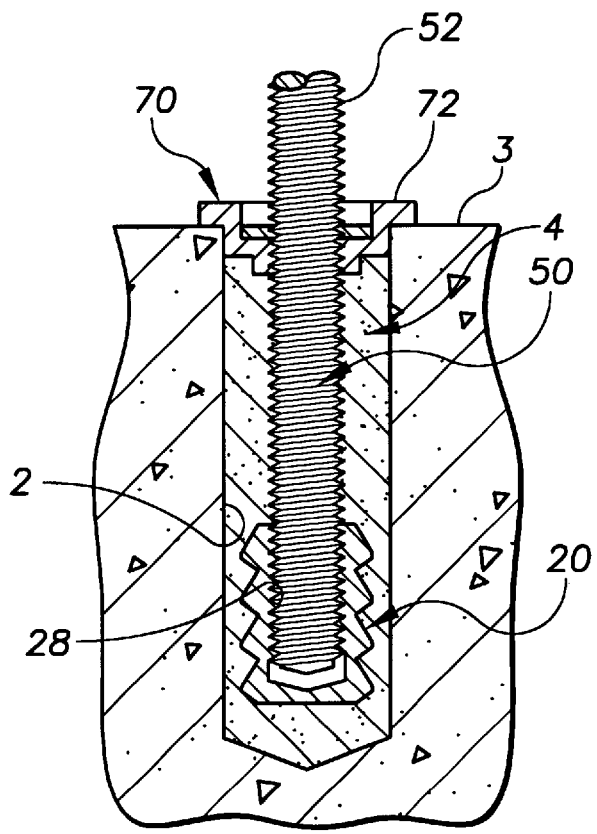
FIG. 4 is an alternative adhesive anchor system with an alternative rigid support member.

In the exemplary alternative embodiment of FIG. 4, the anchor member 20 is preassembled with the threaded shaft 50. The anchor member 20 and at least a portion of the shaft 50 are disposed in the bore 2 of the work material so that the anchor member 20 is spaced apart from the surface 3 thereof. An adhesive is also disposed in the bore, usually before the anchor member, in adhering contact with the anchor member and with the portion of the shaft between the anchor member and the work surface for bonding thereto.

In some embodiments that exclude the tube member, the threaded shaft may be TEFLON or merely coated therewith, or have a release agent applied thereto to permit removal of the threaded shaft from the bore after the adhesive hardens or cures.

In the exemplary embodiment of FIG. 4, the threaded opening 28 extends only partially through the anchor member 20, but in other embodiments the threaded bore extends between the first and second ends thereof and is covered by a cap member as discussed above.

In some applications, illustrated in FIG. 3, the threaded shaft 50 is part of a bolt that clamps a fixture 8 to the work surface 3. In other applications, illustrated in FIG. 4, a threaded portion 52 of the shaft 50 extends beyond the work surface 3, and may have a threaded member, for example a nut, applied thereto.

The inner diameter oft he tube member 30 is preferably slightly greater than an outer diameter of the shaft 50 so that the tube member 30 supports to the shaft, thus minimizing deflection of the shaft when shear loading is applied thereto.

In one embodiment, the ratio of the outer diameter of the tube member 30, or the diameter of the threaded shaft 50 in embodiments that do not include the tube member, to an outer diameter of the anchor member 20 is not more than approximately 70 percent.

In one application, for example, the threaded shaft diameter is approximately 0.375 inches and the diameter of the anchor member is approximately 0.625 inches, wherein ratio therebetween is approximately 60 percent. And in another application, the threaded shaft diameter is approximately 0.500 inches and the anchor member diameter is approximately 0.750 inches, wherein the ratio therebetween is approximately 67 percent.

FIG. 4 illustrates an alternative embodiment having a rigid annular member 70 disposed between the threaded shaft 50 and the bore 2 of the work material near the surface thereof. The rigid annular member 70 may have screw threads engaged with the threaded shaft 50 and/or be bonded in the bore. In some embodiments, the member 70 is disposed freely about the threaded shaft and is bonded in the bore.

In FIG. 4, the rigid annular member 70 provides additional support for the threaded shaft 50, particularly under a shear loading conditions. The exemplary rigid member 70 includes a flange portion 72 mounted on the work surface 3, but in other embodiments all portions thereof may be disposed at or below the surface 3 of the work material and may be embedded in the adhesive 4. In embodiments where the threaded shaft is disposed through a tube member, as in FIG. 3, a rigid annular member may be disposed between the tube member and the bore, and fastener thereto by the adhesive.

In overhead applications, the member 70 may be used to retain the entire anchor assembly in the work material bore while the adhesive cures.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. An adhesive anchoring system for disposition within an adhesive material disposed within a bore hole of a substrate for anchoring a fastener within the substrate, comprising:

an anchor member being externally ribbed for fixedly interacting with an adhesive material, disposed within a bore hole of a substrate, when the adhesive material disposed within the bore hole of the substrate sets, and having an internally threaded opening extending between first and second opposite ends of said anchor member for threadedly fixing a fastener within the bore hole of the substrate;

tubular means, being substantially coaxially aligned with said threaded opening of said ribbed anchor member and having a first end portion fixedly connected in an integral manner to said first end of said ribbed anchor member prior to insertion of said ribbed anchor member into the adhesive material disposed within the bore hole of the substrate, for facilitating insertion manipulation of said ribbed anchor member into the adhesive material disposed within the bore hole of the substrate, and having a shaft portion for defining an opening within the set adhesive material into which a fastener can be inserted for threaded engagement with said anchor member so as to be anchored within the substrate; and a cap member covering said second end of said opening of said ribbed anchor member so as to prevent the adhesive material, disposed within the bore hole of the substrate, from entering said second end of said opening of said ribbed anchor member when said ribbed anchor member is inserted into the adhesive material disposed within the bore hole of the substrate.

2. The adhesive anchoring system as set forth in claim 1, further comprising:

a threaded shaft fastener disposed within said tubular means for threaded engagement with said threaded opening of said ribbed anchor member.

3. The adhesive anchoring system as set forth in claim 2, wherein:

said threaded shaft fastener has a predetermined diametrical extent; and said tubular means has a diametrical extent which is slightly greater than said predetermined diametrical extent of said threaded shaft fastener.

4. The adhesive anchoring system as set forth in claim 1, wherein:

said anchor member has a counterbore defined within said first end thereof; and said first end portion of said tubular means is fixedly disposed within said counterbore of said anchor member.

5. The adhesive anchoring system as set forth in claim 1, wherein:

said cap member is fabricated from a foam material.

6. The adhesive anchoring system as set forth in claim 1, further comprising:

a tube cap disposed upon said second end portion of said tubular means.

7. The adhesive anchoring system as set forth in claim 1, wherein:

said anchor member is fabricated from a material selected from a group comprising metal and plastic; and said tubular means is fabricated from a material selected from a group comprising plastic, metal, paper, and cardboard.

8. The adhesive anchoring system as set forth in claim 1, wherein:

said tubular means has indicia disposed upon an exterior surface portion thereof for visually indicating the depth of insertion of said anchor member within the adhesive material disposed within the bore hole defined within the substrate.

9. The adhesive anchoring system as set forth in claim 1, further comprising:

adhesive means for fixedly connecting said first end portion of said tubular means in said integral manner to said first end of said ribbed anchor member.

10. The adhesive anchoring system as set forth in claim 1, further comprising:

means defining an interference fit between said tubular means and said anchor member for fixedly connecting said first end portion of said tubular means in said integral manner to said first end of said ribbed anchor member.

11. The adhesive anchoring system as set forth in claim 1, wherein:
said cap member comprises an end wall integral with said anchor member.

12. The adhesive anchoring system as set forth in claim 1, wherein:
said cap member comprises a plug disposed within said second end of said opening of said ribbed anchor member.

13. The adhesive anchoring system as set forth in claim 1, wherein:
said cap member comprises a recessed portion covering said second end of said opening of said ribbed anchor member for accommodating an end portion of the fastener to be threadedly engaged with said anchor member.

14. An adhesive anchoring system for anchoring a member within adhesive material disposed within a bore hole which is defined within a work material member and which extends inwardly into the work material member from a surface portion of the work material member, comprising:
an anchor member being externally ribbed for fixedly interacting with an adhesive material disposed within a bore hole defined within a work material member when the adhesive material disposed within the bore hole of the work material member sets and having an internally threaded opening defined therein for threadedly fixing a fastener within the bore hole of the work material member, said anchor member being spaced from the work material surface portion when said anchor member is adhered within the adhesive material disposed within the bore hole defined within the work material member; and
tubular means, being substantially coaxially aligned with said threaded opening of said ribbed anchor member and having a first end portion fixedly connected in an integral manner to said ribbed anchor member prior to insertion of said ribbed anchor member into the adhesive material disposed within the bore hole defined within the work material member, for facilitating insertion manipulation of said ribbed anchor member into the adhesive material disposed within the bore hole defined within the work material member, and extending between said anchor member and the work material surface portion of the work material member such that a second end portion of said tubular means protrudes beyond the work material surface portion of the work material member so as to facilitate insertion therein of a fastener to be threadedly engaged within said internally threaded opening of said ribbed anchor member.

15. The adhesive anchoring system as set forth in claim 1, wherein:
said threaded opening of said anchor member extends between first and second opposite ends thereof;
said tubular means is fixedly connected to said first end of said anchor member; and
a cover member is disposed over said second end of said anchor member so as to close said threaded opening at said second end of said anchor member.

16. The adhesive anchoring system as set forth in claim 15, wherein:
said cover member comprises a plug disposed within said second end of said opening of said anchor member.

17. The adhesive anchoring system as set forth in claim 15, wherein:
said cover member comprises a recessed portion covering said second end of said opening of said anchor member for accommodating an end portion of the fastener to be threadedly engaged with said anchor member.

18. The adhesive anchoring system as set forth in claim 15, wherein:
said cover member is fabricated from a foam material.

19. The adhesive anchoring system as set forth in claim 14, wherein:
said cover member comprises an end wall integral with said anchor member.

20. The adhesive anchoring system as set forth in claim 14, further comprising:
a threaded shaft fastener disposed within said tubular means for threaded engagement with said threaded opening of said anchor member.

21. The adhesive anchoring system as set forth in claim 14, wherein:
said anchor member has a counterbore defined within said first end thereof; and
said first end portion-of said tubular means is fixedly disposed within said counterbore of said anchor member.

22. The adhesive anchoring system as set forth in claim 1, further comprising:
a tube cap disposed upon said second end portion of said tubular means.

23. The adhesive anchoring system as set forth in claim 1, wherein:
said anchor member is fabricated from a material selected from a group comprising metal and plastic; and
said tubular means is fabricated from a material selected from a group comprising plastic, metal, paper, and cardboard.

24. The adhesive anchoring system as set forth in claim 14, wherein:
said tubular means has indicia disposed upon an exterior surface portion thereof for visually indicating the depth of insertion of said anchor member within the adhesive material disposed within the bore hole defined within the substrate.

25. The adhesive anchoring system as set forth in claim 14, further comprising:
adhesive means for fixedly connecting said first end portion of said tubular means in said integral manner to said first end of said anchor member.

26. The adhesive anchoring system as set forth in claim 14, further comprising:
means defining an interference fit between said tubular means and said anchor member for fixedly connecting said first end portion of said tubular means in said integral manner to said first end of said anchor member.

27. The adhesive anchoring system as set forth in claim 14, wherein:
said anchor member has a plurality of ribbed members disposed around external surface portions of said anchor member.

28. An adhesive anchoring system for disposition within an adhesive material disposed within a bore hole of a substrate for anchoring a fastener within the substrate, comprising:

an externally ribbed anchor member for fixedly interacting with an adhesive material, disposed within a bore hole of a substrate, when the adhesive material disposed within the bore hole of the substrate sets, and having an internally threaded opening extending between first and second opposite ends thereof for threadedly fixing a fastener within the bore hole of the substrate;

a tube member being substantially coaxially aligned with said threaded opening of said ribbed anchor member, having a first end portion mounted within said first end of said ribbed anchor member, and having a second end portion into which a fastener can be inserted for threaded engagement with said anchor member so as to be anchored within the substrate;

means fixedly connecting said first end portion of said tube member in an integral manner to said first end of said ribbed anchor member prior to insertion of said ribbed anchor member into the adhesive material disposed within the bore hole of the substrate for facilitating the insertion manipulation of said ribbed anchor member into the adhesive material disposed within the bore hole of the substrate; and a cap member covering said second end of said opening of said ribbed anchor member so as to prevent the adhesive material, disposed within the bore hole of the substrate, from entering said second end of said opening of said ribbed anchor member when said ribbed anchor member is inserted into the adhesive material disposed within the bore hole of the substrate.

29. The adhesive anchoring system as set forth in claim 28, further comprising:

a threaded shaft fastener disposed within said tube member for threaded engagement with said threaded opening of said ribbed anchor member.

30. The adhesive anchoring system as set forth in claim 28, wherein:

said anchor member has a counterbore defined within said first end thereof; and said first end portion of said tube member is fixedly disposed within said counterbore of said anchor member.

31. The adhesive anchoring system as set forth in claim 28, wherein:

said means fixedly connecting said first end portion of said tube member in an integral manner to said first end of said ribbed anchor member comprises an adhesive.

32. The adhesive anchoring system as set forth in claim 28, wherein:

said means fixedly connecting said first end portion of said tube member in an integral manner to said first end of said ribbed anchor member comprises an interference fit.

33. An adhesive anchoring system for anchoring a member within adhesive material disposed within a bore which is defined within a work material member and which extends inwardly into the work material member from a surface portion of the work material member, comprising:

an externally ribbed anchor member for fixedly interacting with an adhesive material, disposed within a bore hole of a work material member, when the adhesive material disposed within the bore hole of the work material member sets, having an internally threaded opening for threadedly fixing a fastener within the bore hole of the work material member, said ribbed anchor member being spaced from the work material surface portion when said ribbed anchor member is adhered within the adhesive material disposed within the bore defined within the work material member ;

a tube member being substantially coaxially aligned with said threaded opening of said ribbed anchor member, having a first end portion mounted within said ribbed anchor member, and extending between said anchor member and the work material surface portion of the work material member such that a second end portion of said tube member protrudes beyond the work material surface portion of the work material member so as to facilitate insertion therein of a fastener to be threadedly engaged with said ribbed anchor member; and means fixedly connecting said first end portion of said tube member in an integral manner to said ribbed anchor member prior to insertion of said ribbed anchor member into the adhesive material disposed within the bore hole of the work material member for facilitating insertion manipulation of said ribbed anchor member into the adhesive material disposed within the bore hole defined within the work material member.

34. The adhesive anchoring system as set forth in claim 23, wherein:

said threaded opening of said anchor member extends between first and second opposite ends thereof;

said tube member is fixedly connected to said first end of said anchor member; and a cover member is disposed over said second end of said anchor member so as to close said threaded opening at said second end of said anchor member.

35. The adhesive anchoring system as set forth in claim 33, further comprising:

a threaded shaft fastener disposed within said tube member for threaded engagement with said threaded opening of said anchor member.

36. The adhesive anchoring system as set forth in claim 33, wherein:

said anchor member has a counterbore defined within said first end thereof; and said first end portion of said tube member is fixedly disposed within said counterbore of said anchor member.

37. The adhesive anchoring system as set forth in claim 33, wherein:

said means fixedly connecting said first end portion of said tube member in an integral manner to said first end of said ribbed anchor member comprises an adhesive.

38. The adhesive anchoring system as set forth in claim 33, wherein:

said means fixedly connecting said first end portion of said tube member in an integral manner to said first end of said ribbed anchor member comprises an interference fit.

* * * * *